United States Patent
Inoue et al.

(10) Patent No.: US 8,006,997 B2
(45) Date of Patent: Aug. 30, 2011

(54) AIR BAG DEVICE FOR PEDESTRIAN

(75) Inventors: Michio Inoue, Aichi-ken (JP); Shigeyuki Suzuki, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/654,322

(22) Filed: Dec. 17, 2009

(65) Prior Publication Data
US 2010/0164203 A1   Jul. 1, 2010

(30) Foreign Application Priority Data
Dec. 25, 2008   (JP) ................. 2008-331230

(51) Int. Cl.
*B60R 21/20* (2006.01)
*B60R 21/36* (2011.01)

(52) U.S. Cl. .............. 280/728.2; 280/730.1; 280/728.3; 180/274; 296/187.04

(58) Field of Classification Search ............. 280/730.1, 280/728.3, 728.2; 296/187.04; 180/274
See application file for complete search history.

(56) References Cited

U.S. PATENT DOCUMENTS

| | | | | |
|---|---|---|---|---|
| 5,653,461 A * | 8/1997 | Fischer | | 280/728.3 |
| 6,189,916 B1 * | 2/2001 | Bowers et al. | | 280/728.3 |
| 6,474,679 B2 * | 11/2002 | Miyasaka et al. | | 280/730.1 |
| 7,150,495 B2 * | 12/2006 | Fayt et al. | | 296/187.02 |
| 7,527,121 B2 * | 5/2009 | Kitte et al. | | 180/274 |
| 2002/0171262 A1 * | 11/2002 | Ozawa | | 296/189 |
| 2005/0140174 A1 * | 6/2005 | Fayt et al. | | 296/187.04 |
| 2005/0206139 A1 * | 9/2005 | Mori et al. | | 280/730.1 |
| 2005/0257979 A1 * | 11/2005 | Hamada et al. | | 180/274 |
| 2009/0127016 A1 * | 5/2009 | Hayashi et al. | | 180/274 |
| 2010/0230937 A1 * | 9/2010 | Thomas et al. | | 280/728.3 |
| 2010/0252350 A1 * | 10/2010 | Hayashi et al. | | 180/274 |
| 2010/0252351 A1 * | 10/2010 | Okamoto et al. | | 180/274 |

FOREIGN PATENT DOCUMENTS

JP   A-2000-264146   9/2000

* cited by examiner

*Primary Examiner* — Faye M. Fleming
*Assistant Examiner* — Drew Brown
(74) *Attorney, Agent, or Firm* — Posz Law Group, PLC

(57) ABSTRACT

An air bag device for pedestrian includes an inflator which discharges an inflating gas, in operation, and an air bag which is inflated with the inflating gas supplied from the inflator thereby to cover a front face of the front pillar. The air bag is contained in a folded state, in an area covered with the front fender panel which is positioned in front of a front pillar and outside of a vehicle along a lateral direction of a hood panel. The front fender panel includes a cover part which is positioned at its back edge close to the front pillar, and arranged so as to cover an upper part of the air bag in the folded state. The cover part is deformed and opened, when it is pressed with the air bag which is being inflated, thereby to protrude the air bag so that the air bag can cover the front face side of the front pillar.

2 Claims, 7 Drawing Sheets

AIR BAG DEVICE FOR PEDESTRIAN

BACKGROUND OF THE INVENTION

1. Field of the Invention

The present invention relates to an air bag device for pedestrian provided with an air bag which is inflated with an inflating gas supplied, in operation, thereby to cover a front face side of a front pillar.

2. Related Art

Conventionally, there has been such an air bag device for pedestrian that a folded air bag is contained below a back edge of a hood panel, and in operation, an inflating gas is supplied to the air bag thereby to push up the back edge of the hood panel, and at the same time, the air bag is moved upward from an under side of the back edge of the hood panel to be arranged at a front face side of the front pillar (Reference should be made to JP-A-2000-264146, for example).

However, in the conventional air bag device for pedestrian, the air bag itself which is being inflated pushes up the back edge side of the hood panel to create an opening for protruding the air bag between the back edge of the hood panel and a cowl below the hood panel. Generally, this hood panel has a double sheet structure including an outer panel formed of sheet metal which is thin and easily flexed, and an inner panel having higher rigidity than the outer panel. Further, the hood panel is provided with a hinge part for opening and closing the hood panel at the back edge side thereof. The air bag which is being inflated plastically deforms the hinge part itself or the inner panel surrounding the hinge part, thereby to push up the back edge of the hood panel. However, the hinge part and its surroundings have high rigidity so that the hood panel can be stably opened and closed. For this reason, it is necessary to increase an inner pressure of the air bag for enabling an area in vicinity of the hinge part to be deformed by the air bag, and so, it is necessary to use an inflator of high output, as the inflator for supplying the inflating gas to the air bag, which has incurred an increase in weight and in size of the air bag device, including a structure for rigidly holding the inflator, and so on.

SUMMARY OF THE INVENTION

The invention has been made in order to solve the above described problems, and it is an object of the invention to provide an air bag device for pedestrian in which an air bag which has been inflated can be favorably arranged at a front face side of a front pillar, without incurring an increase in weight and in size.

According to the invention, there is provided an air bag device for pedestrian including an inflator which discharges an inflating gas in operation, and an air bag which is inflated with the inflating gas supplied from the inflator thereby to cover a front face side of a front pillar, wherein the air bag is contained in a folded state, in an area covered with a front fender panel which is positioned in front of the front pillar and outside of a vehicle along a lateral direction of a hood panel, and the front fender panel includes a cover part which is positioned at its back edge side close to the front pillar, and arranged so as to cover an upper part of the air bag in the folded state, the cover part being deformed and opened, when it is pressed with the air bag which is being inflated, thereby to protrude the air bag so that the air bag can cover the front face side of the front pillar.

In the air bag device for pedestrian according to the invention, when the inflating gas is discharged from the inflator to enter into the air bag, in operation, the air bag is inflated. On this occasion, the air bag presses and opens the cover part at the back edge side of the fender panel, while deforming the cover part, thereby to cover the front face side of the front pillar. Unlike the hood panel having the double sheet structure including the outer panel and the inner panel to be opened and closed, the fender panel is stationarilly fitted to the frame side of the vehicle. Usually, the fender panel is formed of a single sheet of thin sheet metal or the like, and deformed in an easily flexible manner with plastic deformation and elastic deformation. For this reason, an inner pressure of the air bag need not be so high as to lift the hood panel, but the inner pressure may be so low as to secure cushion action for protecting a pedestrian from the front pillar. Accordingly, it is possible to use a compact inflator of a small output as the inflator to be used, and holding strength of the inflator can be decreased.

Therefore, in the air bag device for pedestrian according to the invention, it is possible to favorably arrange the inflated air bag at the front face side of the front pillar, without incurring an increase in weight and in size.

Moreover, in case where the front fender panel includes the cover part and a common part other than the cover part, and the cover part and the common part are respectively provided with fitting parts to be fitted to a frame of the vehicle, it is desirable that the fitting part in the cover part can be more easily detached from the frame side than the fitting part in the common part. That is, the fitting part in the cover part has such fitting strength that the fitting part in the cover part is easily detached from the frame side.

In the above described structure, because the fitting part of the cover part is connected to the frame side in a state before operation of the air bag device, the cover part is arranged without occurring a backlash or the like, and can be easily opened by detaching the fitting part from the frame side, when it is pressed with the inflating air bag. In this manner, in the above described structure, it is possible to restrain accidental opening and backlash of the cover part, without damaging easiness in opening the cover part, when the air bag is inflated.

In this case, as a structure for fitting the fitting part in the cover part to a fitting seat at the frame side by tightening a bolt, it is desirable that one of the fitting part and the fitting seat is provided with an insertion hole into which the bolt is inserted, and also provided with a relief opening at a peripheral edge of the insertion hole, the relief opening allowing the bolt to be relatively removed from the insertion hole, when the cover part is opened with a pressure of the air bag, thereby to release connection between the fitting part and the fitting seat.

In the above described structure, it is possible to stably fit the cover part to the fitting seat at the frame side, simply by tightening the bolt. When the cover part is opened, the bolt is relatively removed from the insertion hole through the relief opening, and a direction in which the bolt is removed can be made constant. In this manner, an excursion of the cover part which is opened can be stabilized, and it is possible to smoothly develop and inflate the air bag to be arranged at the front face side of the front pillar.

Moreover, in case where a connecting member which is fixed to the frame side is connected to the cover part so that a distance of separation of the cover part from the frame can be restricted, when the cover part is opened, an opening degree of the cover part can be restrained. Therefore, it is possible to prevent the cover part from scattering and to prevent the edge of the cover part from interfering with the pedestrian. Further, in the above described structure, the cover part which has been opened can press the air bag against the front pillar at the back face side thereof, and it is possible to prevent the air bag from being detached from the front face side of the front pillar.

DETAILED DESCRIPTION OF THE PREFERRED EMBODIMENTS

Figure 1:
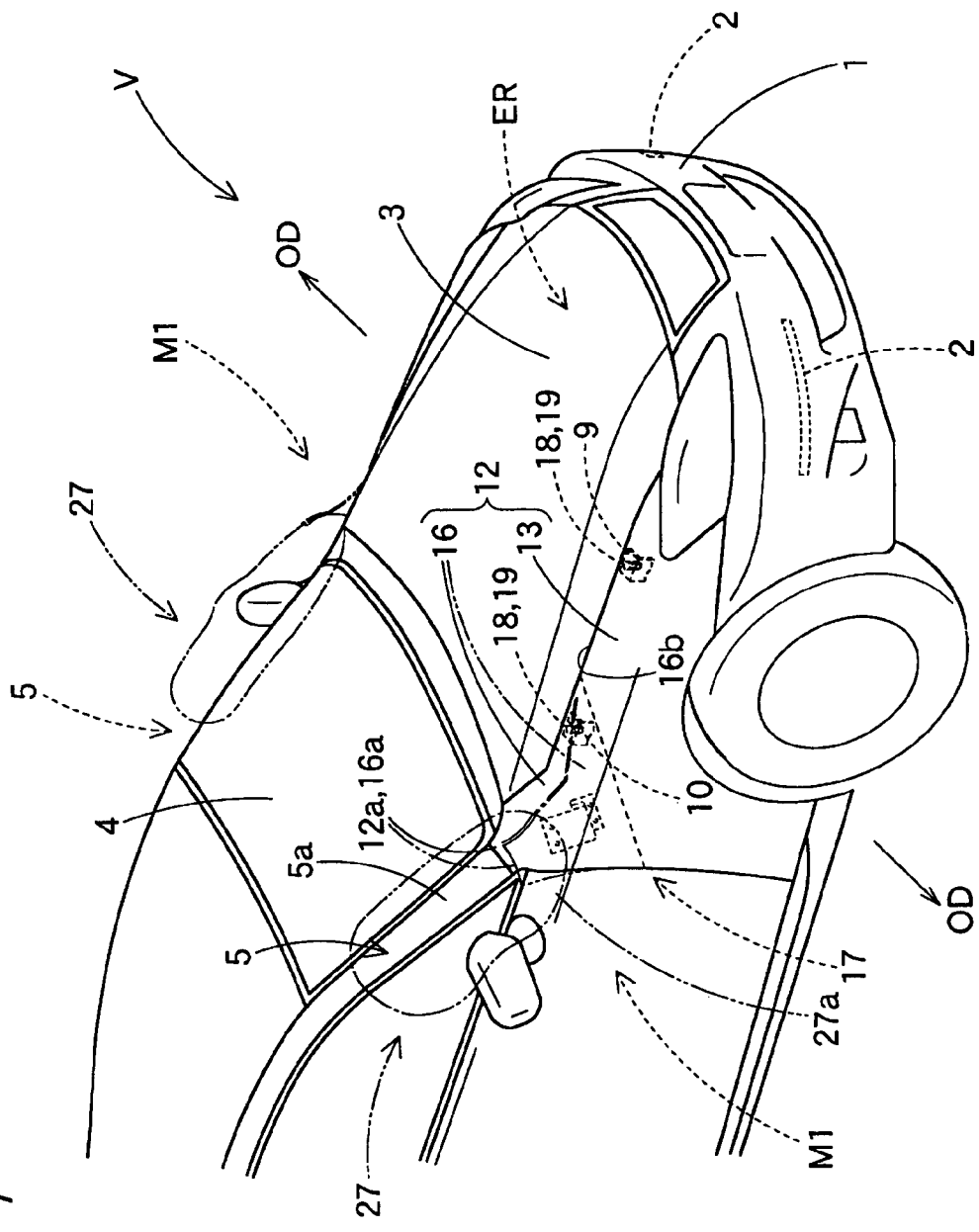
FIG. 1 is a perspective view showing an air bag device for pedestrian in a first embodiment of the invention in a state mounted on a vehicle.

Now, an embodiment of the invention will be described referring to the drawings. As shown in FIG. 1, air bag devices for pedestrian (hereinafter, simply referred to as air bag devices) M1 in a first embodiment are mounted on a vehicle V at a forward side of right and left front pillars 5 of a front glass 4.

It is to be noted that upward, downward, right, and left directions in this description respectively correspond to upward, downward, right, and left directions of the vehicle V, while the vehicle V proceeds straight ahead.

In the embodiments, the air bag device including an air bag 27 which covers a front face 5a of the front pillar 5 at the right side of the vehicle V will be described. Because the air bag device including an air bag which covers the front face 5a of the front pillar 5 at the left side is only symmetrical to the air bag device at the right side, and description of the air bag device on the front pillar 5 at the left side will be omitted.

Figure 2A:
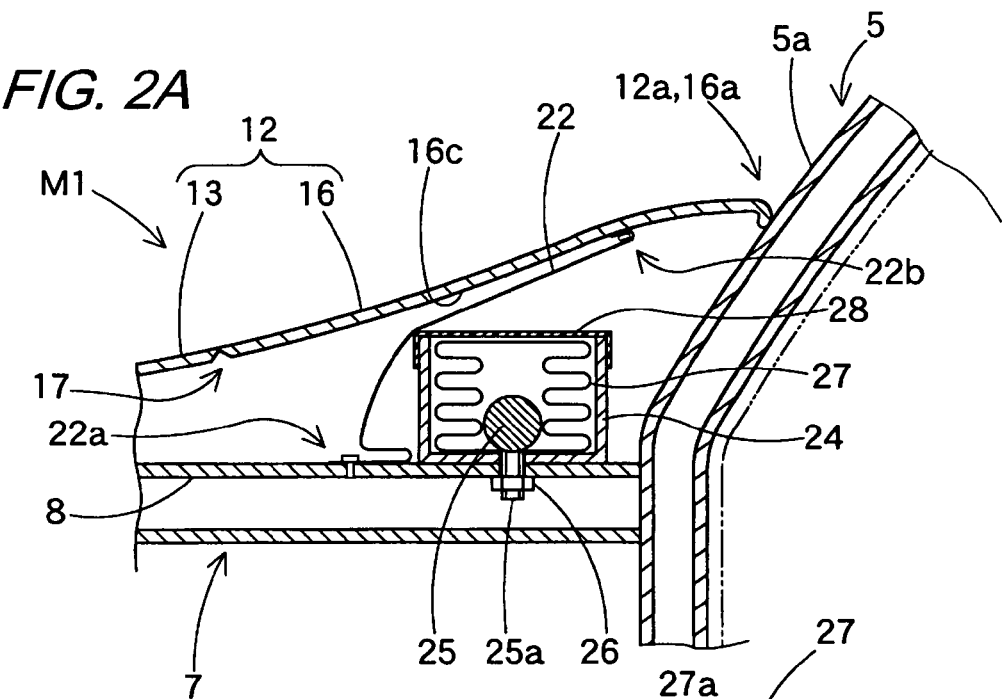
FIGS. 2A and 2B are schematic views in vertical section, taken along a longitudinal direction in vicinity of a cover part of a fender panel for explaining operation of the air bag device in the first embodiment.
Figure 2B:
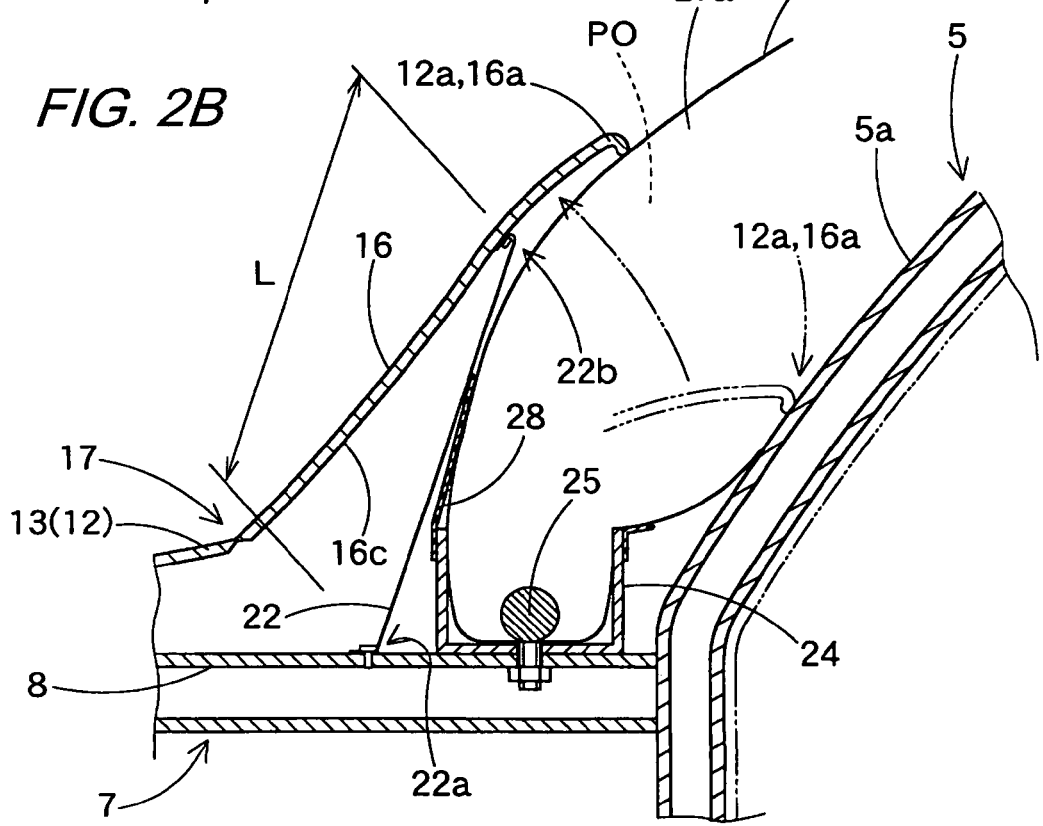

The air bag device M1 is provided at a back edge 12a of a front fender panel (hereinafter, simply referred to as a fender panel) 12 which is arranged in a direction OD outward of the vehicle in a lateral direction of a hood panel 3, and includes the air bag 27 capable of covering the front face 5a of the front pillar 5 of the vehicle V. As shown in FIGS. 2A and 2B, the air bag device M1 includes the air bag 27, an inflator 25 for supplying an inflating gas to the air bag 27, in operation, a case 24 which contains the inflator 25 and the air bag 27, and a cover part 16 which is provided in the fender panel 12 and adapted to be pressed and opened with the air bag 27 which is being inflated.

The case 24 is formed of sheet metal in a box-like shape which is open in its upper part, and contains the inflator 25 and the air bag 27 in a folded state. The case 24 is provided with a lid member 28 which can be easily opened when the air bag 27 is inflated, so that rain may not intrude into the inflator 25 which is contained in the case.

The inflator 25 is provided with a plurality of bolts 25a with which the case 24 and the air bag 27 are fastened together, and secured with nuts 26 to a frame 7 which is a structural member of the vehicle V, that is, a hood ridge reinforce 8 in the first embodiment. When an operation signal is inputted to this inflator 25 from a determined air bag operating circuit, the inflating gas is discharged from a gas discharge outlet, which is not shown, to be supplied to the air bag 27. The air bag operating circuit actuates the inflator 25, when it has received a signal from a sensor 2 (See FIG. 1) which is provided on a front bumper 1 of the vehicle V and can detect a collision against a pedestrian. It would be sufficient that this inflator 25 can secure cushion action for protecting the pedestrian from the front pillar 5, even though the hood panel 3 is not lifted by the air bag 27 which is being inflated with the inflating gas supplied from the inflator 25. Therefore, an inflator which is as compact and of a small output as possible is used as the inflator 25.

When the air bag 27 has been completely inflated with the inflating gas supplied from the inflator 25, the air bag 27 takes a form of a bag in a substantially cubical shape extending in a vertical direction so as to cover the front face 5a of the front pillar 5 which is arranged in a direction OD outward of the vehicle in a lateral direction of the front glass 4, by protruding upward from the case 24 thereby to open the lid member 28 and the cover part 16.

The fender panel 12 is formed of a single sheet of sheet metal in the first embodiment, as shown in FIGS. 1 to 3B. The fender panel 12 is positioned in front of the front pillar 5 in proximity of the front pillar 5, and includes the cover part 16 which is arranged so as to cover an upper part of the case 24 which contains the air bag 27 in a folded state, and a common part 13 other than the cover part 16. The cover part 16 is provided in a shape of a substantially triangular plate of which a part 16a of the fender panel 12 close to the front glass 4 (a back edge part) is an apex, and a part which spreads in a taper shape extending diagonally downward from the back edge 16a is a bottom side opposed to the apex (the back edge part) 16a. An area including the bottom side has a thin wall thickness so that it can serve as a hinge part 17, when the cover part is opened.

Figure 3A:
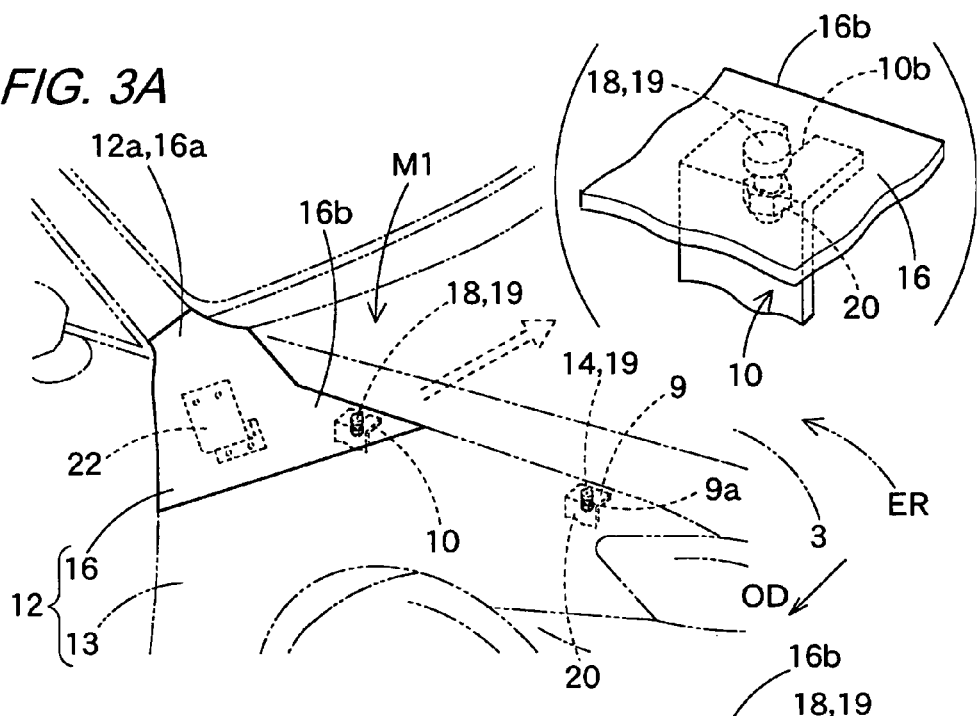
FIGS. 3A and 3B are schematic perspective views for explaining the operation of the air bag device in the first embodiment.
Figure 3B:
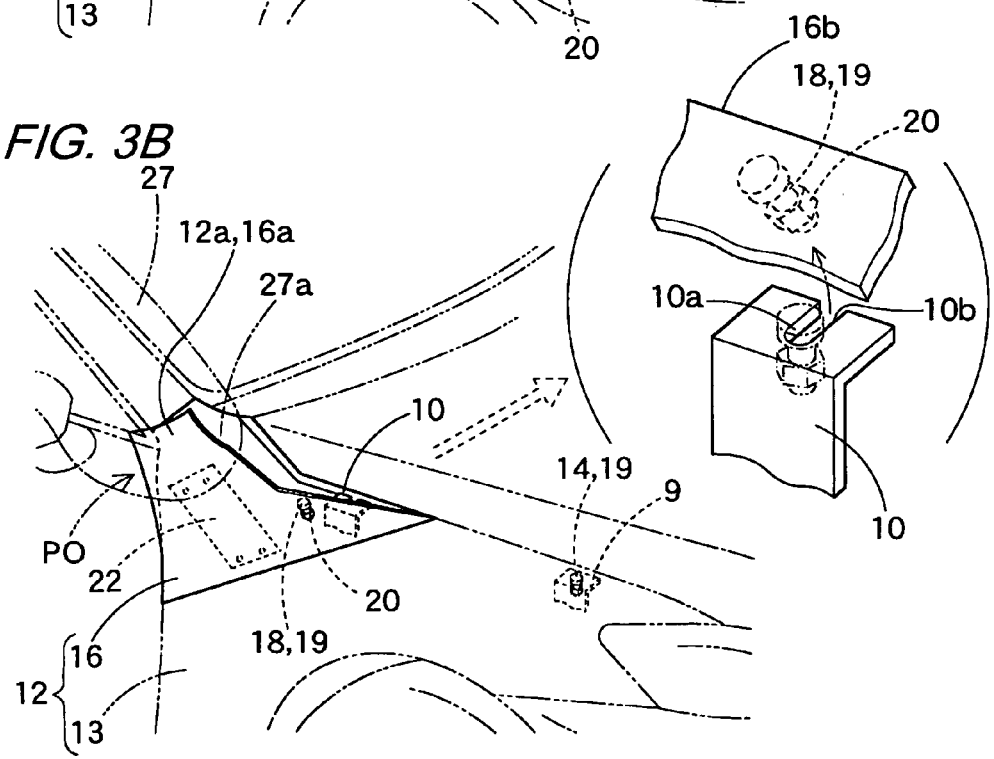

As shown in FIGS. 3A and 3B, a fitting part 18 to be fitted and fixed to a fitting seat 10 which is provided on the hood ridge reinforce 8 is formed close to an inner edge 16b of the cover part 16 adjacent to the hood panel 3. The fitting part 18 is provided with a bolt 19 which is projected downward. The fitting seat 10 has an insertion hole 10a for inserting the bolt 19. By inserting the bolt 19 into the insertion hole 10a, and tightening the bolt 19 with a nut 20, it is possible to fasten the bolt 19 to the fitting seat 10 thereby to fix the cover part 16 to the frame 7 of the vehicle V.

In the first embodiment, a relief opening 10b which is open toward the hood panel 3 is formed at a peripheral edge of the insertion hole 10a in the fitting seat 10. This relief opening 10b is utilized for moving the bolt 19 which has been inserted into the insertion hole 10a and tightened with the nut 20, toward the hood panel 3 (toward an engine room ER) in a direction perpendicular to an axis of the bolt 19, thereby to remove the bolt 19 from the fitting seat 10. In the first embodiment, a pressure of the inflating air bag 27 for pressing the cover part 16 to open is also utilized as a pressure for pressing the bolt 19 toward the hood panel 3 in this manner.

A plurality of fitting parts 14 respectively including the bolts 19 are also provided in the common part 13 of the fender panel 12. The fitting parts 14 are respectively fitted and fixed to fitting seats 9 which are provided on the hood ridge reinforce 8 and so on of the frame 7 of the vehicle. The fitting seats 9 are arranged corresponding to the fitting parts 14 which are provided at a plurality of positions near an outer peripheral edge of the common part 13, and formed with insertion holes 9a for inserting the bolts 19. However, unlike the fitting seat 10 corresponding to the cover part 16, the fitting seats 9 corresponding to the common part 13 are not provided with the relief openings 10b for allowing the bolts 19 to be removed. Therefore, when the bolts 19 of the fitting parts 14 are inserted into the insertion holes 9a in the fitting seats 9 and tightened with the nuts 20, the fitting parts 14 are stably fitted and fixed to the frame 7 with no anxiety of detaching from the fitting seats 9.

Further, in the first embodiment, a flexible connecting member 22 which is fixed to the hood ridge reinforce 8 of the frame 7 is connected to a back face 16c of the cover part 16, as shown in FIGS. 2A and 2B. This connecting member 22 restricts a distance of separation of the cover part 16 from the hood ridge reinforce 8, when the cover part 16 is pressed with the inflating air bag 27 and opened. In the first embodiment, a length L of the connecting member 22 from a root portion 22a adjacent to the hood ridge reinforce 8 to a tip end portion 22b adjacent to the cover part 16 is set to be such a length that the back edge 16a of the cover part 16 which has been opened can press a lower part 27a of the inflated air bag 27 against the front face 5a of the front pillar 5.

In the air bag device M1 in this first embodiment, when the inflator 25 is actuated by the signal from the air back operating circuit, after the device has been mounted on the vehicle V, the inflating gas is discharged from a gas discharge outlet, which is not shown, of the inflator 25, and the air bag 27 is inflated with the inflating gas as shown by a two-dot chain line in FIG. 1 and a two-dot chain line in FIGS. 3A and 3B. On this occasion, as shown in FIGS. 2A and 2B, the air bag 27 protrudes from the case 24 by pressing the lid member 28 to open, and at the same time, presses the cover part 16 at the back edge 12a of the fender panel 12 to open, while flexing the cover part 16, by plastically deforming the hinge part 17. Then, the air bag 27 protrudes upward from an opening PO for protrusion which is enlarged between the back edge 16a of the cover part 16 and the front face 5a of the front pillar 5 thereby to cover the front face 5a of the front pillar 5. On this occasion, the fender panel 12 is stationarily fixed to the vehicle frame 7, and formed of a single sheet of thin sheet metal, unlike the hood panel 3 having a double sheet structure including an outer panel and an inner panel to be opened and closed. Therefore, the fender panel 12 is deformed in an easily flexible manner with plastic deformation. For this reason, an inner pressure of the air bag 27 need not be so high as to lift the hood panel 3, but the inner pressure may be so low as to secure cushion action for protecting the pedestrian from the front pillar 5. Accordingly, it is possible to use a compact inflator of a small output as the inflator 25, and holding strength of the inflator can be decreased.

Therefore, in the air bag device M1 in the first embodiment, it is possible to favorably arrange the inflated air bag 27 at a side of the front face 5a of the front pillar 5, without incurring an increase in weight and in size.

In the first embodiment, as shown in FIGS. 3A and 3B, the fender panel 12 includes the cover part 16 and the common part 13 other than the cover part 16, and the cover part 16 and the common part 13 are respectively provided with the fitting parts 18, 14 which are fitted to the fitting seats 10, 9 on the frame 7 of the vehicle. The fitting part 18 in the cover part 16 has such a fitting strength that it can be easily detached from the frame 7 when the air bag 27 is inflated, by removing the bolt 19 from the insertion hole 10a through the relief opening 10b at the peripheral edge of the insertion hole 10a, as compared with the fitting part 14 of the common part 13 which is fitted to the fitting seat 9 so as not to be detached. For this reason, in the first embodiment, because the fitting part 18 of the cover part 16 is connected to the hood ridge reinforce 8 of the frame 7 in a state before operation of the air bag device M1, the cover part 16 is arranged without occurring a backlash or the like, and can be easily opened by detaching the fitting part 18 of the cover part 16 from the frame 7, when it is pressed with the inflating air bag 27. In this manner, in the first embodiment, it is possible to restrain accidental opening and backlash of the cover part 16, without damaging easiness in opening when the air bag 27 is inflated.

Particularly, in the first embodiment, as the structure for fitting the fitting part 18 of the cover part 16 to the fitting seat 10 on the frame 7 by tightening the bolt 19 with the nut 20, the insertion hole 10a for inserting the bolt 19 is provided in the fitting seat 10, and further, at a peripheral edge of the insertion hole 10a, the relief opening 10b for removing the bolt 19 from the insertion hole 10a is provided, whereby connection between the fitting part 18 and the fitting seat 10 is released, when the cover part 16 is opened with the pressure of the air bag 27. Accordingly, in the first embodiment, it is possible to stably fit the cover part 16 to the fitting seat 10 on the hood ridge reinforce 8 of the frame 7, simply by tightening the bolt 19. When the cover part 16 is opened, the bolt 19 is removed from the insertion hole 10a through the relief opening 10b. A direction in which the bolt 19 is removed can be made constant toward the relief opening 10b at the peripheral edge of the insertion hole 10a, that is, toward the engine room ER, in this embodiment. In this manner, an excursion of the cover part 16 which is opened can be stabilized, and the air bag 27 can be smoothly developed and inflated to be arranged at a side of the front face 5a of the front pillar 5.

Moreover, in the first embodiment, the connecting member 22 which is fixed to the frame 7 is connected to the cover part 16 so that the distance of separation of the cover part 16 from the hood ridge reinforce 8 can be restricted, when the cover part 16 is opened. Therefore, in the air bag device M1 in the first embodiment, an opening degree of the cover part 16 can be restrained, and it is possible to prevent the cover part 16 from scattering, and to prevent the back edge 16a or the inner edge 16b of the cover part 16 from interfering with the pedestrian. Further, in the first embodiment, the connecting member 22 is set to have the length L for restricting the distance of separation of the cover part 16 from the frame 7 so that the connecting member 22 can press the air bag 27 against the front pillar 5 at the back face 16c of the cover part 16 which has been opened. Therefore, in the first embodiment, because the opening degree of the cover part 16 is restricted by the connecting member 22, disengagement of the air bag 27 from the front face 5a of the front pillar 5 can be prevented. Even though the air bag 27 holds the pedestrian, it is possible to prevent disengagement of the air bag 27 from the front face 5a of the front pillar 5, and it is possible to stably protect the pedestrian from the front pillar 5.

Although in the first embodiment, the cover part 16 provided in the fender panel 12 is illustrated in a shape of a substantially triangular plate, a cover part 16A may be so set as to be opened at least in vicinity of the front pillar 5 in the direction OD outward of the vehicle by means of a hinge part 17A extending in a longitudinal direction, as in the air bag device M2 in the second embodiment, as shown in FIGS. 4 to 7B. The air bag device M2 in the second embodiment includes a case 24, an inflator 25, an air bag 27, and a lid member 28 which are similar to those in the first embodiment, and description of them will be omitted.

Figure 4:
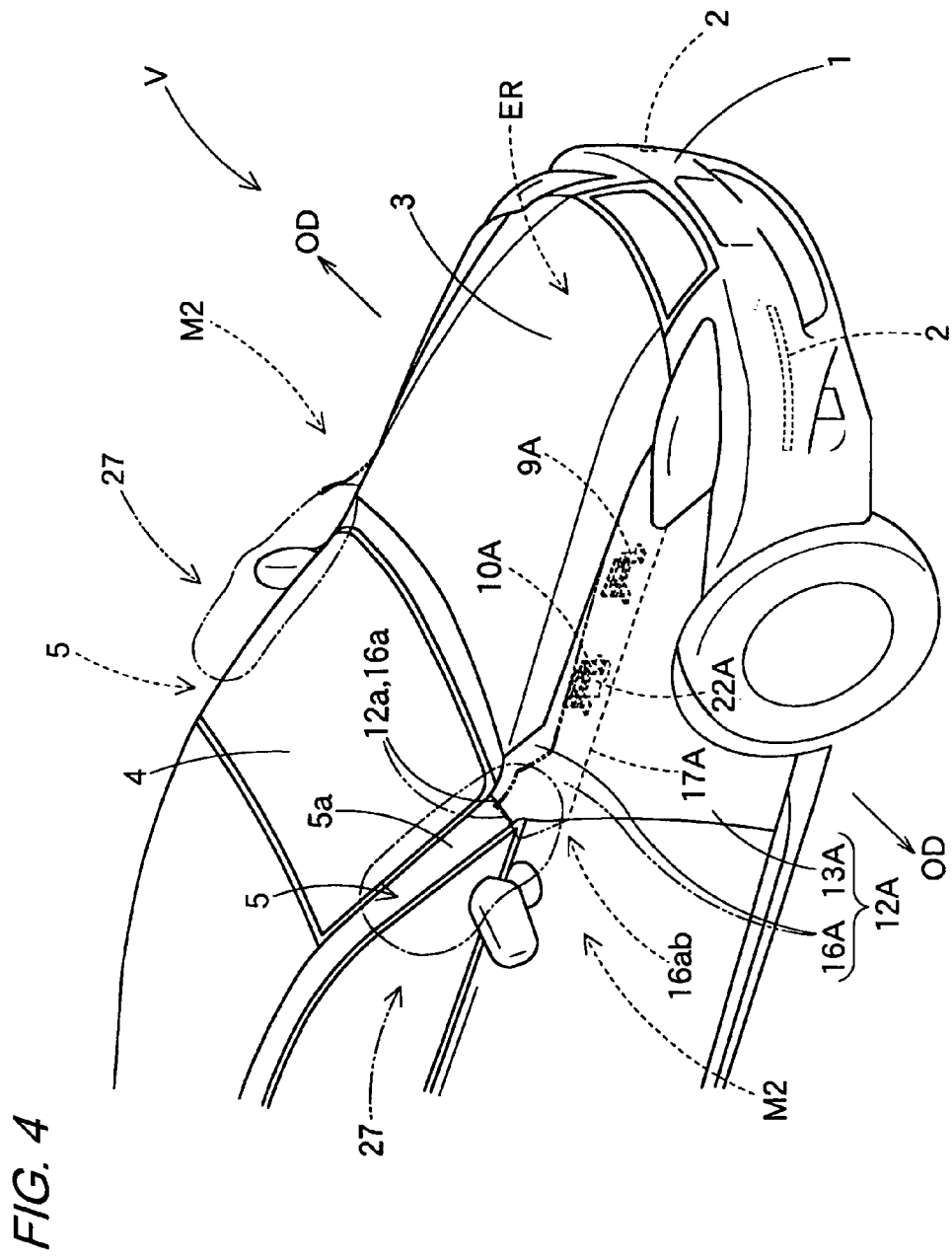
FIG. 4 is a perspective view showing an air bag device for pedestrian in a second embodiment of the invention in a state mounted on a vehicle.
Figure 5A:
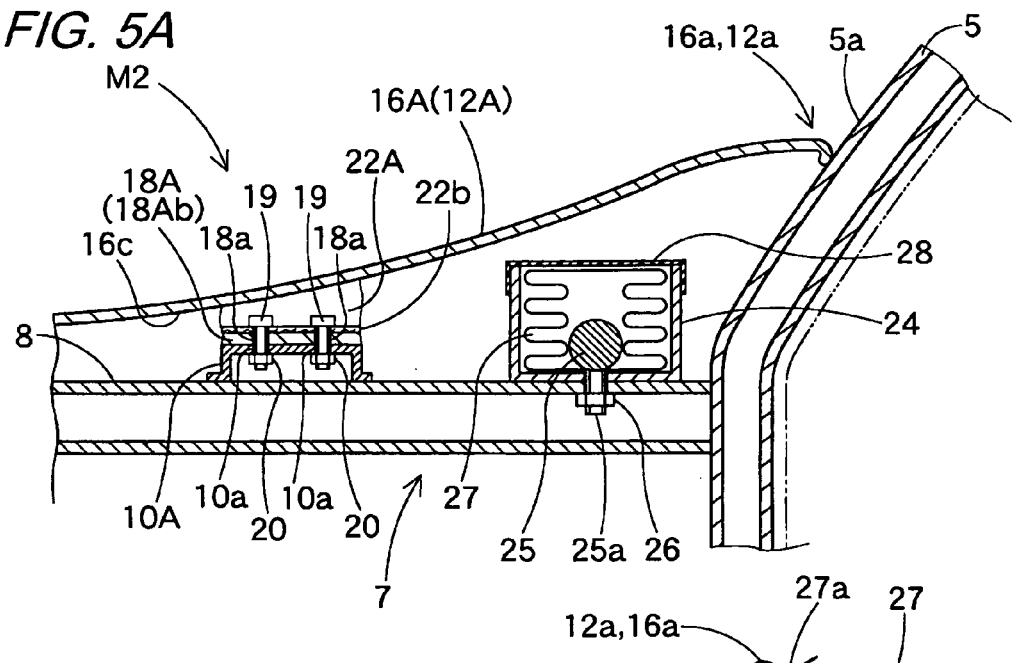
FIGS. 5A and 5B are schematic views in vertical section, taken along a longitudinal direction in vicinity of a cover part of a fender panel for explaining operation of the air bag device in the second embodiment.
Figure 5B:
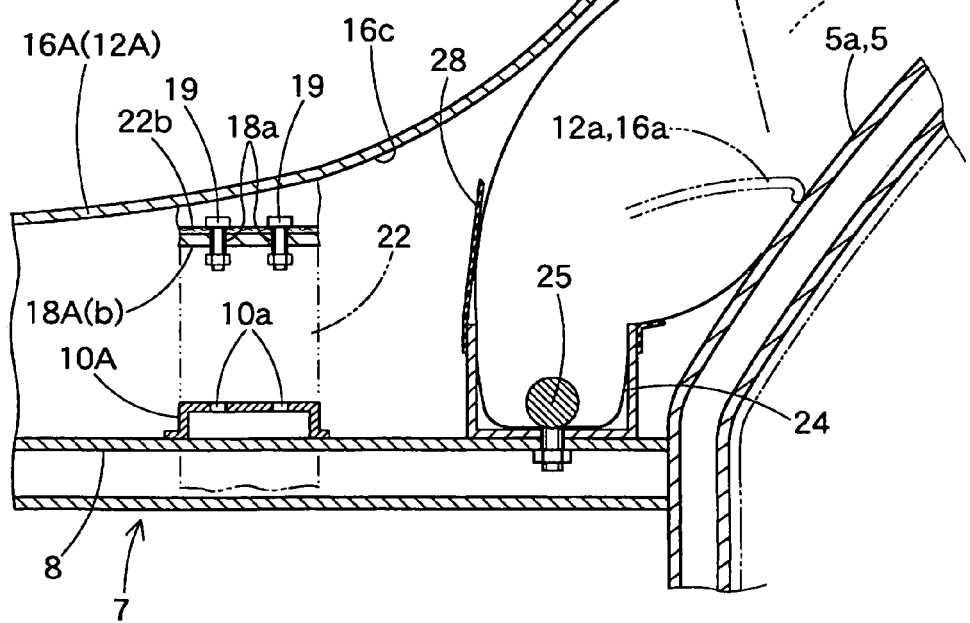
Figure 6A:
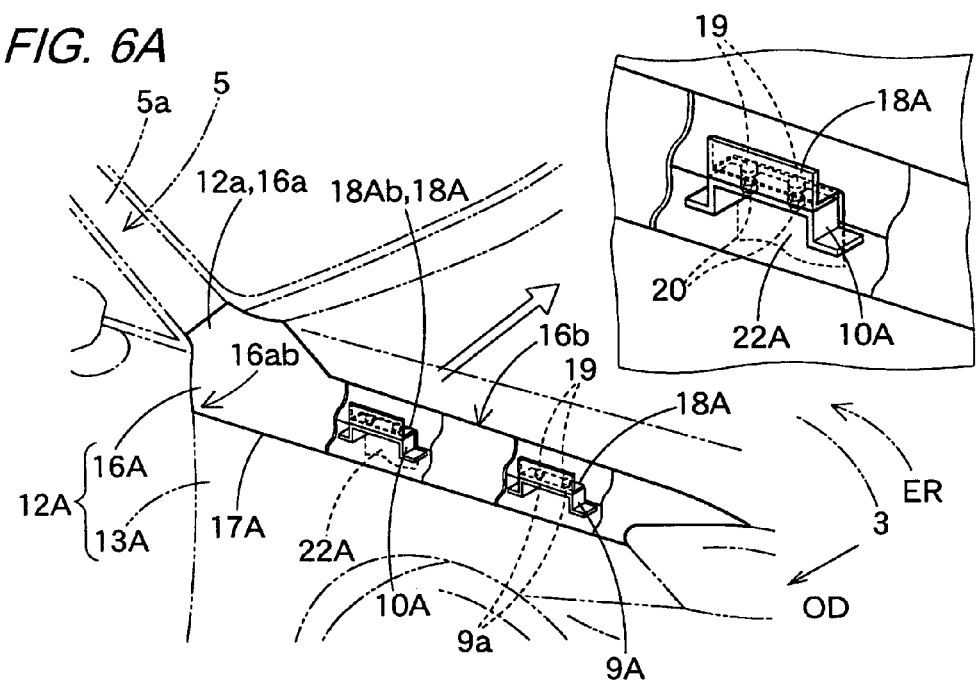
FIGS. 6A and 6B are schematic perspective views for explaining the operation of the air bag device in the second embodiment.
Figure 6B:
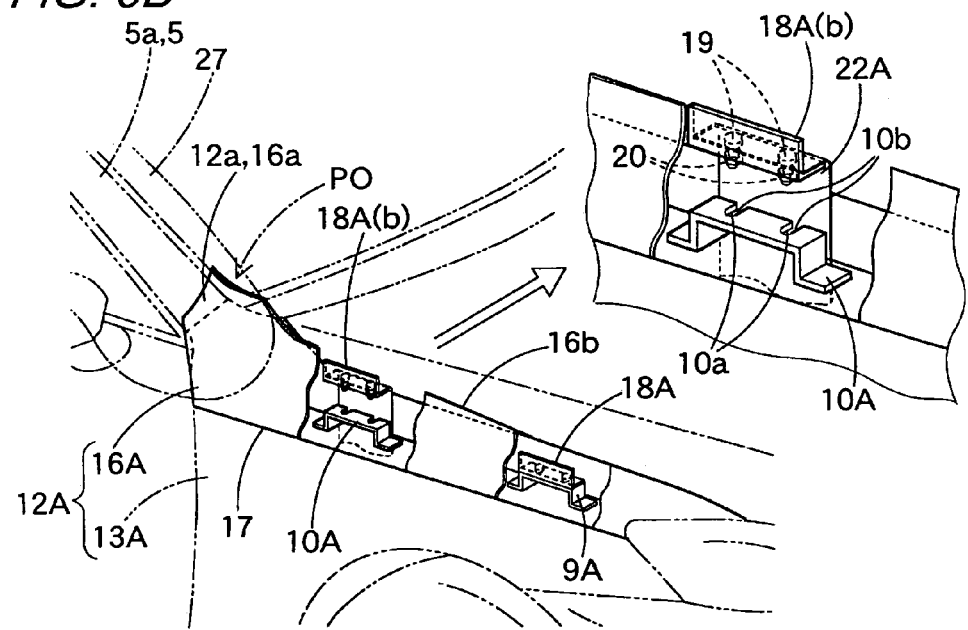
Figure 7A:
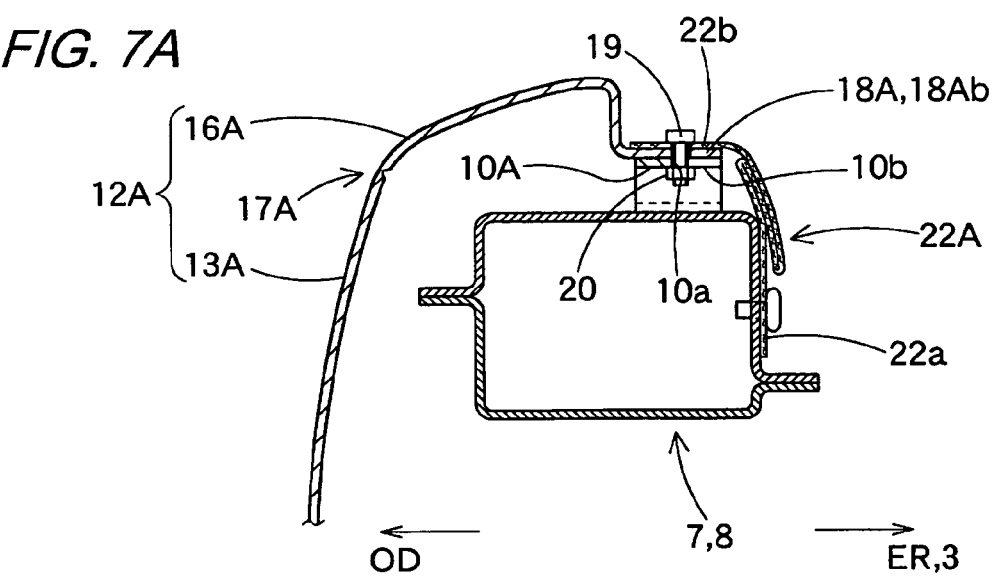
FIGS. 7A and 7B are schematic views in vertical section, taken along a lateral direction of the vehicle for explaining an open state of the cover part.
Figure 7B:
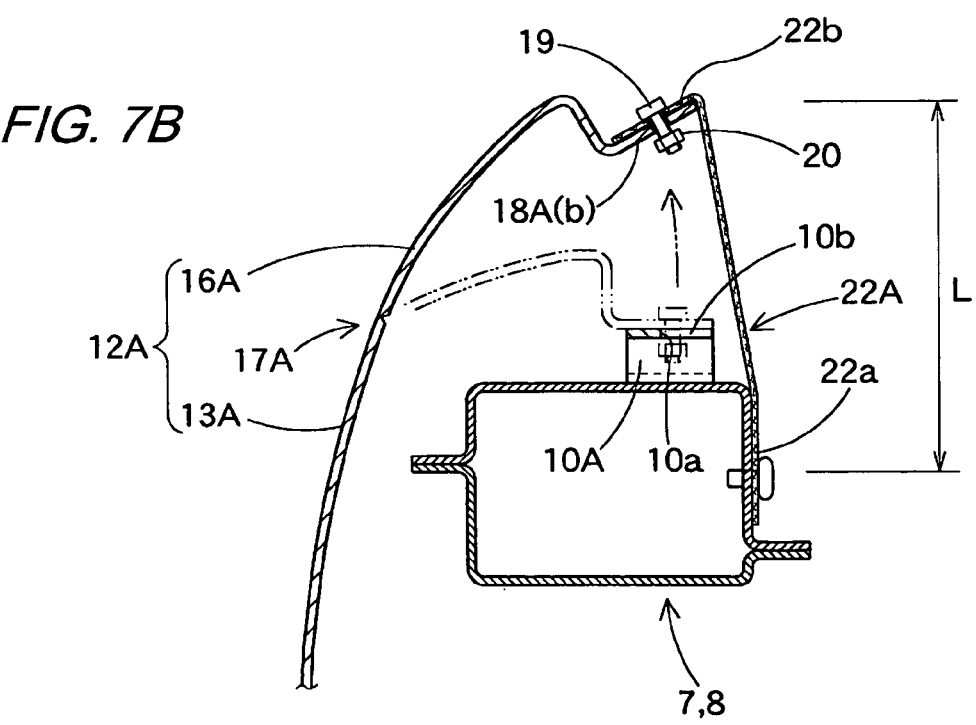

A fender panel 12A in this second embodiment too is formed of a single sheet of sheet metal, and positioned at a forward side of the front pillar 5 in proximity of the front pillar 5. The fender panel 12A includes the cover part 16A which is so arranged as to cover an upper part of the case 24 in which the air bag 27 is contained in a folded state, and a common part 13A other than the cover part 16A. As shown in FIGS. 4, 6A and 6B, the cover part 16A has an area in a shape of a substantially rectangular plate slightly extending downward in the direction OD outward of the vehicle from its inner edge 16b adjacent to the hood panel 3, and the thin walled hinge part 17A for opening the cover part 16A is formed so as to extend forward from a lower end 16ab of a back edge 16a, provided that an area of the front pillar 5 extending downward from a front glass 4 is the back edge 16a. Moreover, an area below the hinge part 17A of the fender panel 12A is formed as the common part 13A.

As shown in FIGS. 5A, 5B, 6A and 6B, the cover part 16A is provided with fitting parts 18A to be fitted and fixed to fitting seats 10A, 9A which are provided on the hood ridge reinforce 8, at two front and back positions near the inner edge 16b adjacent to the hood panel 3. Insertion holes 18a into which the bolts 19 can be inserted are respectively formed in the fitting parts 18A.

On the other hand, insertion holes 9a, 10a into which the bolts 19 can be inserted are formed in the fitting parts 9A, 10A of the hood ridge reinforce 8 of the frame 7. The insertion hole 10a in the fitting seat 10A at the backward side is provided with a relief opening 10b for allowing the bolt 19 to be removed (See FIGS. 5A, 5B, 7A and 7B). In the fitting part 10A in the second embodiment too, the relief opening 10b which opens toward the engine room ER is formed at a peripheral edge of the insertion hole 10a of the fitting seat 10, in the same manner as in the first embodiment. This relief opening 10b is utilized for moving the bolt 19 which has been inserted into the insertion hole 10a and tightened with the nut 20, toward the hood panel 3 (toward the engine room ER) in a direction perpendicular to an axis of the bolt 19, thereby to detach the bolt 19 from the fitting seat 10A. Of course, in this second embodiment too, a pressure of the inflating air bag 27 for pressing the cover part 16 to open is also utilized as a pressure for pressing the bolt 19 toward the hood panel 3.

Moreover, in the second embodiment, the respective fitting parts 18 and the respective fitting seats 9A, 10A are designed in such a manner that the two bolts 19 can be inserted into each of them.

Further, the fitting part 18A and the fitting part 14 in the first embodiment are provided at fitting positions to the frame 7 in the common part 13A, and the fitting seats 9A and 9 are provided on the frame 7 corresponding to these fitting parts 18A, 14.

Still further, in the second embodiment too, a flexible connecting member 22A which is fixed to the hood ridge reinforce 8 of the frame 7 is connected to a back face 16c of the cover part 16A. In the same manner as in the first embodiment, this connecting member 22A restricts a distance of separation of the cover part 16A from the hood ridge reinforce 8, when the cover part 16A is pressed to open with the inflating air bag 27. Further, a length L of the connecting member 22A from a root portion 22a adjacent to the hood ridge reinforce 8 to a tip end portion 22b adjacent to the cover part 16A is set to be such a length that the back edge 16a of the cover part 16A can press a lower part 27a of the inflated air bag 27 against the front face 5a of the front pillar 5. Further, in the second embodiment, the tip end portion 22b is fixed to the fitting part 18Ab at a backward side corresponding to the fitting seat 10A, by means of the bolt 19 which is inserted into the insertion hole 18a and tightened with the nut 20.

In the air bag device M2 in this second embodiment too, the inflating gas is discharged from the inflator 25, in operation, and flows into the air bag 27, thereby to inflate the air bag 27. On this occasion, the air bag 27 presses the cover part 16A adjacent to the back edge 12a of the fender panel 12A to open, while deforming the hinge part 17A, thereby to cover the front face 5a of the front pillar 5. On this occasion, the fender panel 12A is deformed so as to be easily flexed, in the same manner as in the first embodiment, and therefore, an inner pressure of the air bag 27 can be made lower to such an extent that cushion action capable of protecting the pedestrian from the front pillar 5 can be secured, but need not be so high as lifting the hood panel 3. Accordingly, an inflator which is compact and has a small output can be used as the inflator 25 to be used, and holding strength of the inflator can be decreased.

Therefore, in the air bag device M2 in the second embodiment too, it is possible to favorably arrange the inflated air bag 27 on the front face 5a of the front pillar 5, without incurring an increase in weight and in size.

In the second embodiment too, it is possible to stably fit the cover part 16A to the fitting seat 10A of the frame 7, by tightening the bolt 19. When the cover part 16A is opened, the bolt 19 is removed from the insertion hole 10a through the relief opening 10b, and a direction in which the bolt 19 is removed can be made constant toward the engine room ER. In this manner, an excursion of the cover part 16A which is opened can be stabilized, and the air bag 27 can be smoothly developed and inflated to be arranged on the front face 5a of the front pillar 5.

Of course, in this second embodiment too, because the fitting parts 18Ab, 18A of the cover part 16A are fitted to the fitting seats 10A, 9A of the frame 7 by means of the bolts 19 and the nuts 20 in a state before operation of the air bag device M2, the cover part 16A is arranged without occurring backlash or the like, and can be easily opened by detaching the fitting part 18Ab from the frame 7, when it is pressed with the inflating air bag 27. For this reason, in the second embodiment too, it is possible to restrain accidental opening and backlash of the cover part 16A without damaging easiness in opening, when the air bag 27 is inflated.

In the second embodiment, the insertion hole 9a of the fitting seat 9A at the front side is not provided with the relief opening 10b. Therefore, although the cover part 16A can be largely moved upward at the back edge 16a, the movement of the cover part 16A is restrained at the inner edge 16b so that the front side can make a smaller upward movement than the back side.

Moreover, in the second embodiment too, the connecting member 22A which is fixed to the frame 7 is connected to the cover part 16A so that it can restrict the distance of separation of the cover part 16A from the frame 7, when the cover part 16 is opened. Therefore, an opening degree of the cover part 16A is restrained, and it is possible to prevent the cover part 16A from scattering, and to prevent the back edge 16a or the inner edge 16b of the cover part 16A from interfering with the pedestrian. Further, the cover part 16A which has been opened can press the air bag 27 against the front pillar 5 at the back face 16c of the back edge 16a, and disengagement of the air bag 27 from the front face 5a of the front pillar 5 can be prevented.

In the first and second embodiments, the fitting seats 10, 10A are provided with the insertion holes 10a into which the bolts 19 can be inserted, and the relief openings 10b. However, the insertion holes for the bolts 19 for fitting the cover parts 16, 16A to the hood ridge reinforce 8 of the frame 7 may be provided in the fitting parts 18, 18Ab of the cover parts 16, 16A, and the relief openings for allowing the bolts 19 to be removed may be provided at peripheral edges of the insertion holes. In this case, unlike a case in the first and second embodiments where the bolts 19 move together with the cover parts 16, 16A when they are opened, the bolts 19 are left on the frame 7, while the fitting parts 18, 18Ab having the insertion holes in the cover parts 16, 16A move.

What is claimed is:

1. An air bag device for a pedestrian comprising:
an inflator which discharges an inflating gas in operation, and
an air bag which is inflated with the inflating gas supplied from the inflator thereby to cover a front face side of a front pillar, wherein
said air bag is contained in a folded state in an area covered with a front fender panel which is positioned in front of the front pillar and outside of a vehicle along a lateral direction of a hood panel,
said front fender panel includes a cover part which is positioned at a back edge thereof close to said front pillar, and arranged so as to cover an upper part of said air bag in the folded state, said cover part being deformed and opened, when said cover part is pressed with said air bag which is being inflated, thereby to protrude said air bag so that the air bag covers the front face side of said front pillar,
said front fender panel includes said cover part and a common part other than said cover part,
said cover part and said common part are respectively provided with fitting parts to be fitted to a frame of the vehicle,
said fitting part in said cover part is more easily detached from said frame than said fitting part in said common part,
said fitting part in said cover part is fitted to a fitting seat at said frame by tightening a bolt, and
one of said fitting part and said fitting seat is provided with an insertion hole into which said bolt is inserted, and also provided with a relief opening at a peripheral edge of said insertion hole, said relief opening allowing said bolt to be relatively removed from said insertion hole, when said cover part is opened with a pressure of the air bag, thereby to release connection between said fitting part and said fitting seat.

2. An air bag device for pedestrian according to claim 1, wherein a connecting member which is fixed to said frame is connected to said cover part so that a distance of separation of said cover part from said frame can be restricted, when said cover part is opened.

* * * * *